(12) United States Patent
Colleoni (10) Patent No.: US 11,677,236 B2
(45) Date of Patent: Jun. 13, 2023

(54) DEVICE FOR DISCHARGING A CAPACITOR (71) Applicant: STMicroelectronics (Tours) SAS, Tours (FR)

(72) Inventor: Eric Colleoni, Tours (FR)

(73) Assignee: STMicroelectronics (Tours) SAS, Tours (FR)

( * ) Notice: Subject to any disclaimer, the term of this patent is extended or adjusted under 35 U.S.C. 154(b) by 72 days.

(21) Appl. No.: 17/197,719

(22) Filed: Mar. 10, 2021

(65) Prior Publication Data
US 2021/0296888 A1    Sep. 23, 2021

(30) Foreign Application Priority Data

Mar. 20, 2020 (FR) ........................................ 2002751

(51) Int. Cl.
*H02H 9/04* (2006.01)
*H02H 3/087* (2006.01)
*H02M 1/088* (2006.01)
*H02M 1/32* (2007.01)

(52) U.S. Cl.
CPC ............ *H02H 9/045* (2013.01); *H02H 3/087* (2013.01); *H02M 1/088* (2013.01); *H02M 1/32* (2013.01); *H02M 1/322* (2021.05)

(58) Field of Classification Search
CPC ....... H02H 9/045; H02H 3/087; H02M 1/088; H02M 1/32; H02M 1/322
See application file for complete search history.

(56) References Cited

U.S. PATENT DOCUMENTS

2016/0190845 A1    6/2016    Chen
2019/0173306 A1*   6/2019    Chang .................. H02J 7/0063

FOREIGN PATENT DOCUMENTS

EP         2460682 A1    6/2012

OTHER PUBLICATIONS

INPI Search Report and Written Opinion for FR 2002751 dated Nov. 10, 2020 (8 pages).

* cited by examiner

*Primary Examiner* — Rafael O De Leon Domenech
(74) *Attorney, Agent, or Firm* — Crowe & Dunlevy (57) ABSTRACT

A device for discharging a capacitor includes a resistive component having a resistance value selectable from among at least three resistance values. The device is configured to be connected in parallel with the capacitor. A circuit operates to select the resistance value of the resistive component.

30 Claims, 2 Drawing Sheets

DEVICE FOR DISCHARGING A CAPACITOR

PRIORITY CLAIM

This application claims the priority benefit of French Application for Patent No. 2002751, filed on Mar. 20, 2020, the content of which is hereby incorporated by reference in its entirety to the maximum extent allowable by law.

TECHNICAL FIELD

The present disclosure generally relates to electronic circuits and, more particularly, to electronic circuits for discharging a capacitor.

BACKGROUND

Electronic devices, particularly electronic circuits, where a capacitor is charged to a DC voltage, are known. When such a device stops operating, either intentionally by being stopped or turned off, or unintentionally, for example, due to a malfunction of the device, it is desirable to discharge the capacitor to avoid for the energy stored therein to be incidentally transmitted to a person in contact with the device.

Such a discharge of the capacitor is particularly desirable when the capacitor is configured to store a significant quantity of energy, for example, at least 0.2 joules, even at least 100 joules, for example, 320 joules, the capacitor then having, for example, a value greater than 625 nF, for example, equal to 1 mF, and being intended to be charged to a DC voltage of one hundred or hundreds of volts, for example, a 800 V voltage. Such a capacitor is, for example, provided in electric vehicles or in electric vehicle chargers.

There is a need to improve at least certain aspects of devices for discharging a capacitor, particularly in the case where the capacitor is intended to store a significant quantity of energy, for example, when the capacitor belongs to an electric vehicle or to an electric vehicle battery charger.

SUMMARY

An embodiment overcomes all or part of the disadvantages of known capacitor discharge devices.

One embodiment provides a device for discharging a capacitor comprising: a resistive component having a value selectable from among at least three values, intended to be connected in parallel with the capacitor; and a circuit configured to select the value of the component.

According to one embodiment, during a discharge of the capacitor, the circuit is configured to select successive decreasing values from among said at least three values.

According to one embodiment, during a discharge of the capacitor, the circuit is configured to select, from among said at least three values, a next value of the resistive component when a discharge level of the capacitor reaches a threshold associated with said next value.

According to one embodiment, the circuit is configured to determine the discharge level of the capacitor from a duration which has elapsed since the beginning of the discharge.

According to one embodiment, the circuit is configured to determine the discharge level of the capacitor from a voltage across the capacitor.

According to one embodiment, the component comprises resistive elements and switches, preferably thyristors, coupled together between a first terminal of the resistive component and a second terminal of the resistive component, the circuit being configured to control each of said switches of the resistive component.

According to one embodiment, the resistive elements and the switches are coupled together so that each of said at least three values is determined by a corresponding combination of states of said switches.

According to one embodiment, the resistive elements and the switches are configured so that the resistive component corresponds to an open circuit when all the switches are off.

According to one embodiment, the resistive elements and the switches are configured so that, during a discharge of the capacitor, each selection of a value of the resistive component results from a turning on of one of said switches associated with this value.

According to one embodiment, during a discharge of the capacitor, the circuit is further configured to condition a selection of a next value of the resistive component on the on state of the switch associated with the current value of the resistive component.

According to one embodiment, the resistive component comprises as many branches in parallel between the first and second terminals of the resistive component as resistive elements, each branch comprising one of the resistive elements in series with one of the switches.

According to one embodiment, the resistive elements and a first one of said switches are in series between the first and second terminals of the resistive component, each of said switches except for the first switch being configured to bypass one of said resistive elements in the on state.

According to one embodiment, the circuit is configured to receive information indicating that the capacitor should be discharged.

According to one embodiment, the resistive component is configured to correspond to an open circuit when its maximum value is selected.

According to one embodiment, in the absence of an indication that the capacitor should be discharged, the device is configured so that the maximum value of the resistive component is selected.

BRIEF DESCRIPTION OF THE DRAWINGS

The foregoing and other features and advantages will be discussed in detail in the following non-limiting description of specific embodiments in connection with the accompanying drawings, in which.

DETAILED DESCRIPTION

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the various systems and applications where a capacitor discharge circuit may be provided have not been detailed, the described embodiments being compatible with such usual systems and applications.

Throughout the present disclosure, unless otherwise specified, the term "connected" is used to designate a direct electrical connection between circuit elements, whereas the term "coupled" is used to designate an electrical connection between circuit elements that may be direct, or may be via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

Unless otherwise specified, the terms "about", "approximately", "substantially", and "in the order of" are used herein to designate a tolerance of plus or minus 10%, preferably of plus or minus 5%, of the value in question.

In the following description, a same reference is used to designate a resistive or capacitive component and the value of this respectively resistive or capacitive component.

In the following description, it is considered that the resistance of a switch in the on state is zero or negligible.

Figure 1:
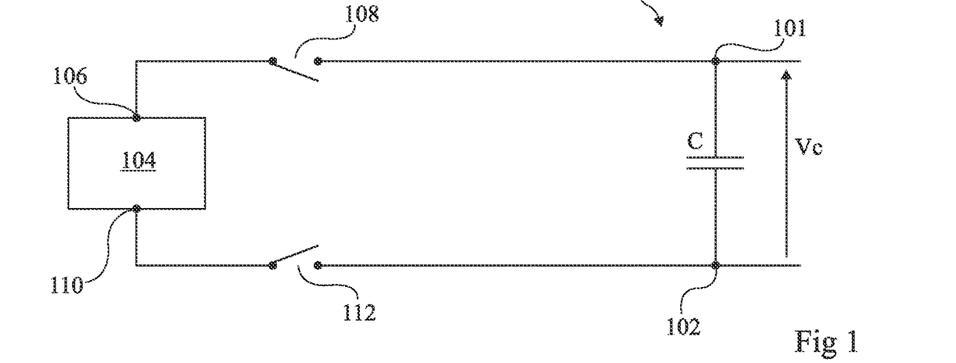
FIG. 1 schematically shows an example of a device of the type to which the described embodiments apply.

FIG. 1 schematically shows an embodiment of a device 1 of the type to which the described embodiments apply.

Device 1 comprises a capacitor C connected between a node 101 and a node 102.

Device 1 further comprises a power source 104, for example, a power converter or a battery such as an electrical vehicle battery. Power source 104 comprises a first terminal 106 coupled to node 101 via a switch 108, and a terminal 110 coupled to node 102 via a switch 112. In other words, switch 108 is connected between terminal 106 and node 101, switch 112 being connected between terminal 110 and node 102.

The power source is configured to charge capacitor C to a DC voltage Vc when switches 108 and 112 are turned on. In other words, in steady or permanent state, voltage Vc is available between the electrodes of capacitor C, that is, in the present example, between nodes 101 and 102.

Nodes 101 and 102 are, for example, connected or intended to be connected to a battery, not shown, device 1, and particularly power source 104, then being used to charge the battery, the power source 104 may itself be a battery.

When device 1 is stopped, for example, when the electric connection between nodes 101 and 102 and the battery is interrupted, the energy stored in capacitor C is then equal to $0.5*C*Vc^2$. As an example, for a 1 mF capacitance C and an 800 V voltage Vc, the energy in capacitor C is then 320 J and may cause the death of a person who would touch one and/or the other of nodes 101 and 102. The above examples of values, for example, correspond to the case where the capacitance C is a DC-link capacitor, which is located between two power conversion stages, for example after a first power conversion stage charging the capacitor C from a battery of an electrical vehicle, and a second power conversion stage supplying traction motors of the electrical vehicle from the voltage across the capacitor C. In other examples, device 1 is an electric vehicle battery charger.

It is thus desirable to enable a discharge of capacitor C or, in other words, to discharge, or dissipate, the energy which is stored therein.

According to the application, constraints of discharge of capacitor C may be defined. Such constraints, for example, correspond to the maximum value that voltage Vc should have after the elapsing of a given time period from the stopping, intentional or not, of device 1. In the field of electric vehicles, standards may define such constraints of discharge of capacitor C, for example, the ISO26262, ISO6469, and ISO17409 standards. In the field of electric vehicles, it is, for example, desirable for voltage Vc to have a value smaller than 60 V less than 1 or 10 seconds, at most, after the stopping of device 1.

To discharge capacitor C, it may be devised to connect, between nodes 101 and 102, a series association of a resistor R and of a switch. The switch would then be controlled to turn on when capacitor C has to be discharged, so that the energy stored in the capacitor is dissipated by resistor R. Resistor R should then be capable of withstanding voltage Vc at the beginning of the discharge, and thus have a relatively high value, in particular in order to limit the instantaneous power at the start of discharge, that is to say in particular in order to limit the value of the current peak at the start of discharge. Meanwhile, for the discharge to be as fast as possible, resistor R should have a relatively low value. Indeed, the higher the value of resistor R, the longer the time constant of the discharge, equal to R*C, and the lower the power which may be dissipated by resistor R.

Further, for example, in the field of electric vehicles, there are few resistance values available for such a resistor of discharge of capacitor C, and they generally do not enable to respect discharge constraints. It could then be devised to associate a plurality of the resistors in series and/or in parallel to obtain an equivalent resistor having a resistance value enabling to respect the discharge constraints. However, this would not always be possible and would further result in a relatively bulky device.

To discharge capacitor C, in particular in the field of electric vehicles, it could also be devised to connect a single-use switch, typically a pyrotechnic switch, in parallel with capacitor C. However, such a switch could only be used once to discharge capacitor C, for example, after an accident implying an electric vehicle provided with capacitor C. However, the use of such a switch has disadvantages inherent to the use of a single-use component (maintenance, replacement, etc.).

The inventor here provides a capacitor discharge device comprising a resistive component having a resistance value selectable among at least three values, intended to be connected in parallel with the capacitor, and a circuit configured to select the resistance value of the resistive component. More precisely, during a discharge of the capacitor, the circuit is configured to select successively decreasing resistance values of the resistive component over a period of time. Thus, the capacitor discharge is slower at the beginning of the discharge, when the voltage across the capacitor is still relatively high, and faster at the end of the discharge, when this voltage is lower. Further, as long as it is not useful to discharge the capacitor, the circuit selects a maximum or default resistance value of the resistive component for which the resistive component behaves as an open circuit. Thus, as long as it is not useful to discharge the capacitor, the resistive component does not modify the operation of the device comprising the capacitor.

Figure 2:
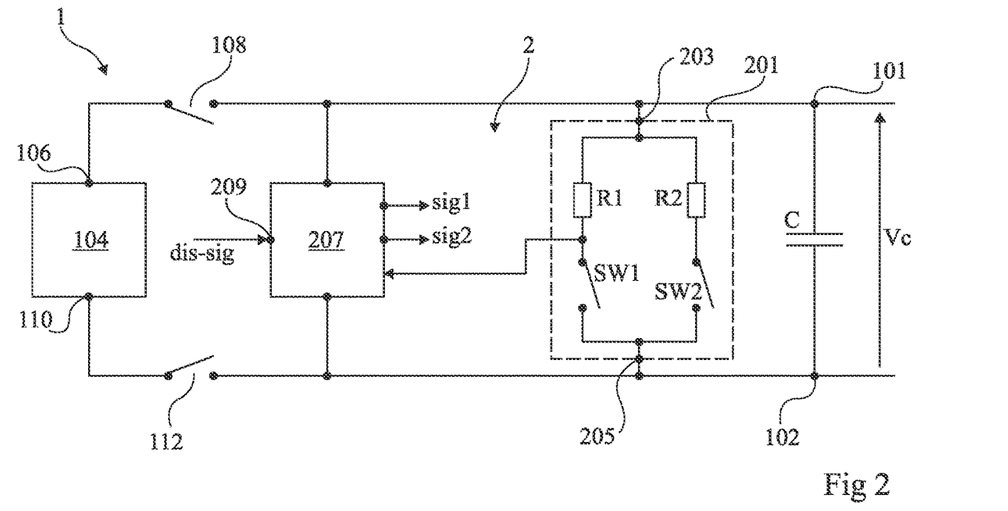
FIG. 2 schematically shows an example of a device comprising a circuit for discharging a capacitor according to an embodiment.

FIG. 2 schematically shows an example of a device comprising a capacitor discharge circuit or device according to an embodiment. More particularly, FIG. 2 shows the device 1 of FIG. 1 provided with a device 2 for discharging capacitor C according to an embodiment. Only the differences between the device 1 of FIG. 1 and the device 1 of FIG. 2 are detailed herein or, in other words, only device 2 is here detailed.

Device 2 comprises a resistive component 201 connected or intended to be connected in parallel with capacitor C. In other words, resistive component 201 comprises a first terminal 203 connected or intended to be connected to node 101, and a second terminal 205 connected or intended to be connected to node 102. The value of the resistance of resistive component 201, measured between its terminals 203 and 205, is selectable among at least three values. One of these resistance values, called maximum or default value, corresponds to the case where resistive component 201 is equivalent, between its terminals 203 and 205, to an open circuit comprising no conductive path between terminals 203 and 205.

In the embodiment illustrated in FIG. 2, component 201 comprises a plurality of branches connected in parallel with one another, between terminals 203 and 205 of resistive component 201. Each branch comprises a switch series-connected with a resistor or a resistive element, between terminals 203 and 205. When all the switches of resistive component 201 are off, outside a phase of discharge of capacitor C, resistive component 201 is at its default value and is equivalent to an open circuit. When capacitor C has to be discharged, a first branch of resistive component 201 is activated by the turning on of the switch of the first branch, whereby a resistance of the resistive component 201 is then equivalent to the resistance of the resistor of the first branch. The activation of this first branch of resistive component 201 marks the beginning of a discharge of capacitor C. According to an embodiment, during the discharge of capacitor C, the other branches of resistive component 201 are then activated one after the other, by the turning on of the switches of these respective branches one after the other. Each activation of a new branch, other than the first one, amounts to coupling the resistor of the new branch in parallel with the resistors of the branches which have already been activated, and thus to selecting one after the other decreasing resistance values of resistive component 201. In such an embodiment, during the discharge of capacitor C, each selection of a resistance value of resistive component 201 thus results from the turning on of one of the switches of resistive component 201, which switch then being said to be associated with this resistance value of resistive component 201.

In the example of FIG. 2, resistive component 201 comprises two branches in parallel, that is, a first branch comprising a resistor R1 in series with a switch SW1, and a second branch comprising a resistor R2 in series with a switch SW2. Thus, when all the switches SW1 and SW2 of component 201 are off, resistive component 201 is equivalent to an open circuit, when switches SW1 and SW2 are respectively on and off, resistive component 201 has a resistance value equal to R1 and, when switches SW1 and SW2 are on, resistive component 201 has a resistance value equal to R1*R2/(R1+R2). Resistive component 201 then effectively has a resistance value selectable among at least three values. Although resistive component 201 can also take a resistance value equal to R2 (switch SW1 off and switch SW2 on), according to an embodiment, this value will not be selected during the discharge of capacitor C.

Device 2 further comprises a circuit 207 configured to control resistive component 201. In other words, circuit 207 is configured to select the resistance value of resistive component 201. Still in other words, circuit 207 is configured to control the off or on state of each switch SW1, SW2 of resistive component 201. Thus, circuit 207 is configured to deliver a control signal to each switch SW1, SW2 of resistive component 201, for example, a signal sig1 for controlling switch SW1 and a signal sig2 for controlling switch SW2.

Although this is not shown herein, circuit 207 preferably comprises a driver for each switch of resistive component 201, each driver being then configured to deliver the control signal of the switch associated therewith. In the example of FIG. 2, circuit 207 preferably comprises a driver (not shown) delivering signal sig1 to switch SW1 and another driver (not shown) delivering signal sig2 to switch SW2. The implementation of the drivers is within the abilities of those skilled in the art.

Circuit 207 is configured to control resistive component 201 based on an indication that capacitor C should or not be discharged. Circuit 207 then comprises an input 209 configured to receive an indication that capacitor C should or not be discharged. Preferably, as long as circuit 207 receives no indication that capacitor C should be discharged, circuit 207 selects the maximum or default resistance value of resistive component 201 or, in other words, circuit 207 controls resistive component 201 so that it is equivalent to an open circuit.

In the example of FIG. 2, input 209 is configured to receive a binary signal dis-sig having a first binary state indicating that capacitor C does not have to be discharged and having a second binary state indicating that the capacitor should be discharged. As an example, signal dis-sig is switched to its second state each time it is detected that a battery connected to nodes 101 and 102 is disconnected from nodes 101 and 102, or each time an accident of an electric vehicle comprising device 2 and capacitor C is detected.

Further, during a discharge of capacitor C, circuit 207 is configured to select successive decreasing resistance values of resistive component 201. As an example, as soon as circuit 207 receives an indication that capacitor C should be discharged, circuit 207 selects a value of resistive component 201 other than its maximum value for which it is equivalent to an open circuit, which marks the beginning of the discharge of capacitor C. Then, during the discharge, circuit 207 successively selects decreasing resistance values of resistive component 201. In the specific example of FIG. 2, when circuit 207 receives the indication that capacitor C should be discharged, the circuit controls the selection of the value R1 of resistive component 201 by turning on the switch SW1 associated with this value, and then, during the discharge, circuit 207 controls the selection of the value R1*R2/(R1+R2) of resistive component 201 by turning on the switch SW2 associated with this value.

During a discharge of capacitor C, circuit 207 is further configured to select the values of resistive component 201 according to a discharge state or level of capacitor C. In other words, during the discharge of capacitor C, circuit 207 is configured to select a next value of resistive component 201 when the discharge level of capacitor C reaches a threshold associated with this next value. Still in other words, during the discharge of capacitor C, circuit 207 is configured to control a switching of a current resistance value of resistive component 201 to a next value of resistive component 201 when the discharge level of capacitor C reaches a threshold associated with this next value.

Circuit 207 is thus configured to determine a discharge state or level of capacitor C. Circuit 207 is further configured to compare this discharge level with one or a plurality of discharge thresholds of capacitor C.

According to the embodiment illustrated in FIG. 2, circuit 207 is configured to determine or estimate the discharge level of capacitor C from voltage Vc thereacross. Circuit 207 is then coupled, preferably connected, to each of nodes 101 and 102 to receive voltage Vc or a voltage representative of voltage Vc. More precisely, to determine the discharge level of capacitor C, circuit 207 is configured to compare voltage Vc with one or a plurality of voltage thresholds, each determining a discharge threshold of capacitor C. During a discharge of capacitor C, circuit 207 is then configured to control the switching of a current value of component 201 to a next lower resistance value of resistive component 201 when voltage Vc reaches the voltage level associated with this next value, for example, when voltage Vc becomes smaller than the voltage threshold.

According to another embodiment, not shown, circuit 207 is configured to determine or estimate the discharge level of capacitor C from a duration which has elapsed since the beginning of the discharge of capacitor C. More precisely, to determine or estimate the discharge level of capacitor C, circuit 207 is configured to compare the duration which has elapsed since the beginning of the discharge with one or a plurality of time thresholds, each determining a discharge threshold of capacitor C. During a discharge of capacitor C, circuit 207 is then configured to control the switching from a current resistance value of resistive component 201 to a next lower resistance value of resistive component 201 when the duration which has elapsed since the beginning of the discharge reaches the time threshold associated with this next resistance value, for example, when the duration which has elapsed since the beginning of the discharge becomes greater than the time threshold.

According to an embodiment, during a discharge of capacitor C, the selection of a next resistance value of resistive component 201 is conditioned on the on state of the switch associated with the current resistance value of resistive component 201. Taking the specific example of FIG. 2, when the current resistance value of resistive component 201 is R1 (SW1 on, SW2 off) and capacitor C discharges, the selection of the next resistance value R1*R2/(R1+R2) of resistive component 201 is conditioned on the on state of switch SW1. It will be within the abilities of those skilled in the art to implement the verification, by circuit 207, that a given switch of resistive component 201 is in the on state, for example, by providing for circuit 207 to be coupled, preferably connected, to each of the conduction terminals of this switch as shown in FIG. 2 for switch SW1.

Although an example of resistive component 201 only comprising two branches in parallel, each comprising a resistive element in series with a switch, has been described hereabove in relation with FIG. 2, it will be within the abilities of those skilled in the art to generalize this example to any number of branches in parallel greater than or equal to three.

Figure 3:
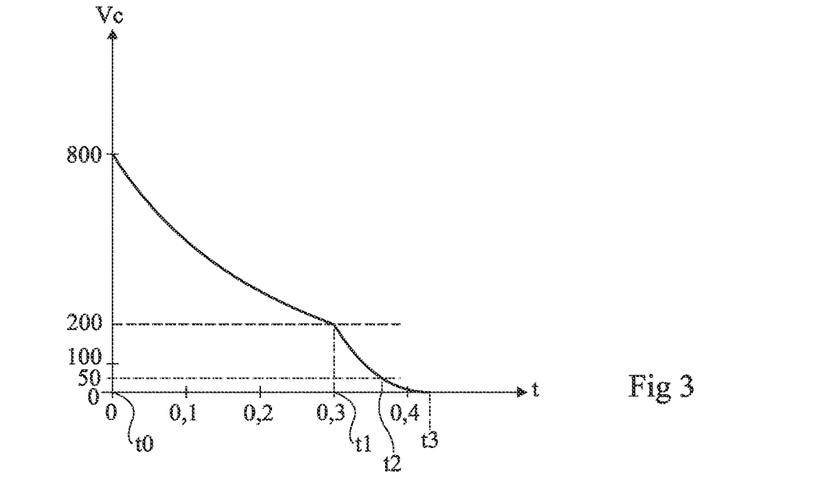
FIG. 3 is a curve illustrating the variation of a voltage across the capacitor of the device of FIG. 2 according to an operating mode.

FIG. 3 is a curve illustrating the variation of voltage Vc across the capacitor C of the device of FIG. 2 according to an embodiment. In the example of FIG. 3, capacitor C is charged to a voltage Vc equal to 800 V, capacitor C is equal to 1 mF, resistance R1 is equal to 231 ohms, and resistance R2 is equal to 47 ohms. Further, during a discharge of capacitor C, the selection of value R1*R2/(R1+R2) of resistive component 201 by circuit 207 is implemented when the discharge level of capacitor C reaches a threshold for which the voltage Vc across capacitor C is equal to or smaller than 200 V.

Before a time t0, capacitor C is charged to voltage Vc equal to 800 V. Further, resistive component 201 is at its maximum or default value and is thus equivalent to an open circuit (switches SW1 and SW2 off).

Following a disconnection of the supply source 104 from the device 1, for example caused by an opening of the switches 108 and/or 112, circuit 207 receives an indication that capacitor C should be discharged and, at time t0, circuit 207 selects the value R1 of resistive component 201 by turning on the switch SW1 associated with this value. The discharge of capacitor C starts at time t0 and voltage Vc decreases from time t0.

At a next time t1, substantially equal to t0+0.3 s, the voltage Vc across capacitor C becomes smaller than 200 V, which is the discharge threshold associated with value R1*R2/(R1+R2) of resistive component 201. This is detected by circuit 207, for example, by means of a comparator of voltage Vc with this threshold. Circuit 207 then selects the value R1*R2/(R1+R2) of resistive component 201 by turning on the switch SW2 associated with this value. As a result, from time t1, the discharge of capacitor C is faster than if resistive component 201 had remained at value R1.

At a next time t3, substantially equal to t0+0.42 s, capacitor C is fully discharged.

In this example, it can be observed that, from a time t2 substantially equal to t0+0.37 s, voltage Vc across capacitor C is smaller than 50 V. The example of FIG. 3 is thus compatible with a discharge of capacitor C such that voltage Vc is smaller than 50 V less than 500 ms after the beginning of the discharge, which would not have been true if resistive component 201 had kept a constant value all along the discharge.

In the example of FIG. 3, the 200 V voltage threshold associated with the value R1*R2/(R1+R2) of resistive component 201 may be replaced with a time threshold equal to 0.3 s. In this case, when a 0.3 s duration has elapsed since time t0 of beginning of the discharge of capacitor C, circuit 207 controls, at time t1=t0+0.3 s, the turning on of switch SW2 to select the value R1*R2/(R1+R2) associated with this time threshold.

Figure 4:
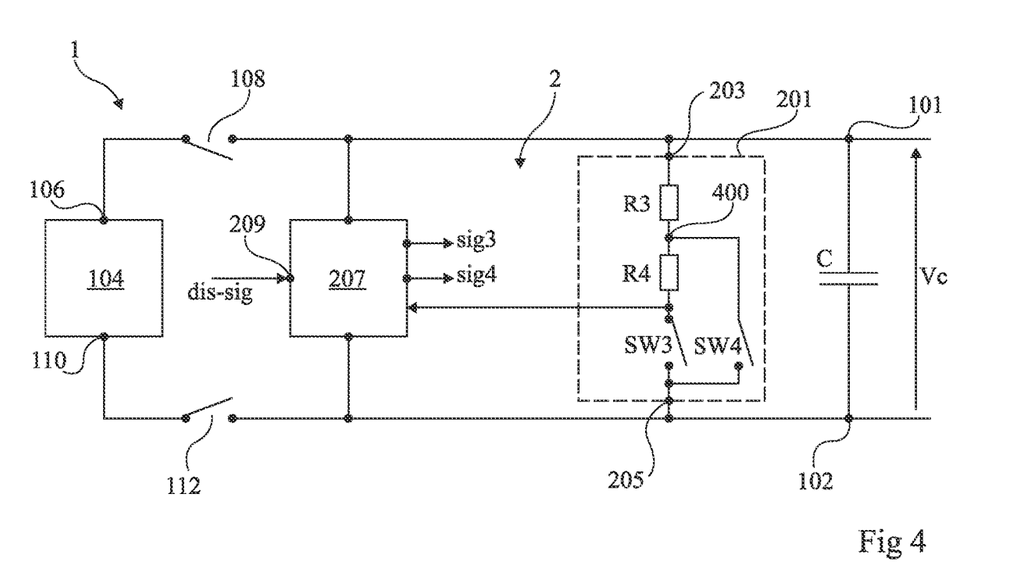
FIG. 4 schematically shows an example of a device comprising a circuit for discharging a capacitor according to another embodiment.

FIG. 4 schematically shows an example of device 1 comprising a device 2 of discharge of capacitor C according to another embodiment. Only the differences between device 2 of FIG. 2 and device 2 of FIG. 4 will be detailed hereafter.

The embodiment of the device 2 of FIG. 4 differs from that of FIG. 2 essentially in that the resistive component 201 does not comprise branches in parallel, each comprising a switch in series with a resistor. Indeed, in the embodiment of FIG. 4, resistive component 201 comprises, between its terminals 203 and 205, a series association of at least two resistors or resistive elements and of a switch and, for each of the resistors but one, a switch configured to bypass, in the on state, the resistor. When all the switches of resistive component 201 are off, outside a phase of discharge of capacitor C, resistive component 201 is then equivalent to an open circuit. When capacitor C should be discharged, the switch in series with the resistors is switched to the on state by circuit 207, whereby resistive component 201 has a resistance that is then equivalent to the sum of these resistors. According to an embodiment, during the discharge of capacitor C, the other switches of resistive component 201 are then turned on one after the other by circuit 207. Each turning on of one of these other switches amounts to removing the resistor that it bypasses from resistive component 201, and thus to selecting a lower resistance value of resistive component 201. In such an embodiment, during the discharge of capacitor C, each selection of a resistance value of resistive component 201 results from the turning on of one of the switches of resistive component 201, this switch being then said to be associated with this value.

In the example of FIG. 4, resistive component 201 comprises two resistors R3 and R4 in series with a switch SW3, and a switch SW4 configured to bypass resistor R4 when switch SW4 is in the on state. Switch SW4 is, for example, connected between terminal 205 and a node 400 of connection of resistor R3 to resistor R4, although it may also be connected to the respective terminals of resistor R4. Thus, when all the switches SW3 and SW4 are off, resistive component 201 is equivalent to an open circuit, when switches SW3 and SW4 are respectively on and off, resistive component 201 has a resistance value equal to R3+R4 and, when switches SW3 and SW4 are on, resistive component 201 has a resistance value equal to R3. Resistive component 201 then effectively has a resistance value selectable among at least three values.

As in FIG. 2, the circuit 207 of device 2 is configured to control resistive component 201, that is, to select the resistance value of resistive component 201. In other words, circuit 207 is configured to control the off or on state of each switch of resistive component 201. Thus, circuit 207 is configured to deliver a control signal to each switch of resistive component 201. In the example of FIG. 4, circuit 207 is configured to deliver a signal sig3 for controlling switch SW3, and a signal sig4 for controlling switch SW4.

As in FIG. 2, circuit 207 preferably comprises a driver for each switch of resistive component 201, each driver being then configured to deliver the control signal of the switch associated therewith.

As in FIG. 2, circuit 207 is configured to control resistive component 201 based on an indication that capacitor C should or not be discharged, and comprises input 209 configured to receive an indication that capacitor C should or not be discharged, input 209 being for example configured to receive signal dis-sig. Preferably, as long as circuit 207 receives no indication that capacitor C should be discharged, circuit 207 selects the maximum or default value of resistive component 201 or, in other words, circuit 207 controls resistive component 201 so that it is equivalent to an open circuit.

As in FIG. 2, during a discharge of capacitor C, circuit 207 is configured to select successive decreasing resistance values of resistive component 201. As an example, as soon as circuit 207 receives an indication that capacitor C should be discharged, circuit 207 selects a resistance value of resistive component 201 other than its maximum or default value for which it is equivalent to an open circuit, which marks the beginning of the discharge of capacitor C. Then, during the discharge, circuit 207 successively selects decreasing resistance values of resistive component 201. In the specific example of FIG. 4, when circuit 207 receives the indication that capacitor C should be discharged, the circuit controls the selection of the resistance value equal to R3+R4 of resistive component 201 by turning on the switch SW3 associated with this value, and then, during the discharge, circuit 207 controls the selection of the resistance value equal to R3 of resistive component 201 by turning on the switch SW4 associated with this value.

As in FIG. 2, during a discharge of capacitor C, circuit 207 is further configured to select the resistance values of resistive component 201 according to a discharge state or level of capacitor C. Circuit 207 is thus configured to determine a discharge state or level of capacitor C.

According to the embodiment illustrated in FIG. 4, circuit 207 is configured to determine or estimate the discharge level of capacitor C from the voltage Vc thereacross.

According to another embodiment, not shown, circuit 207 is configured to determine or estimate the discharge level of capacitor C from a duration which has elapsed since the beginning of the discharge of capacitor C.

According to an embodiment, the selection of a next resistance value of resistive component 201, during a discharge of capacitor C, is conditioned on the on state of the switch associated with the current resistance value of resistive component 201. Taking the specific example of FIG. 4, while the current resistance value of resistive component 201 is equal to R3+R4 (SW3 on, SW4 off) and capacitor C discharges, the selection of the next resistance value R3 of resistive component 201 is conditioned on the on state of switch SW3. It will be within the abilities of those skilled in the art to implement the verification, by circuit 207, that a given switch of resistive component 201 is in the on state, for example, by providing for circuit 207 to be coupled, preferably connected, to each of the conduction terminals of this switch as shown in FIG. 4 for switch SW3.

Although an example of a resistive component 201 comprising only two resistors R3 and R4 in series with a switch SW3 and one switch SW4 configured to bypass resistor R4 has been described hereabove in relation with FIG. 4, it will be within the abilities of those skilled in the art to generalize this example to any number of resistors in series with a switch, each of the series resistors except for one of the resistors being associated with a switch configured to bypass it in the on state.

As an example of operation, in the case where: capacitance C is equal to 1 mF; capacitor C is charged to a voltage Vc equal to 800 V; resistance R3 is equal to 39 ohms; resistance R4 is equal to 192 ohms; and the selection of resistance value R3 of resistive component 201 by circuit 207 is implemented when the discharge level of capacitor C reaches a threshold for which the voltage Vc across capacitor C is equal to 200 V, the same operation as that described in relation with FIG. 3 is obtained.

Figure 5:
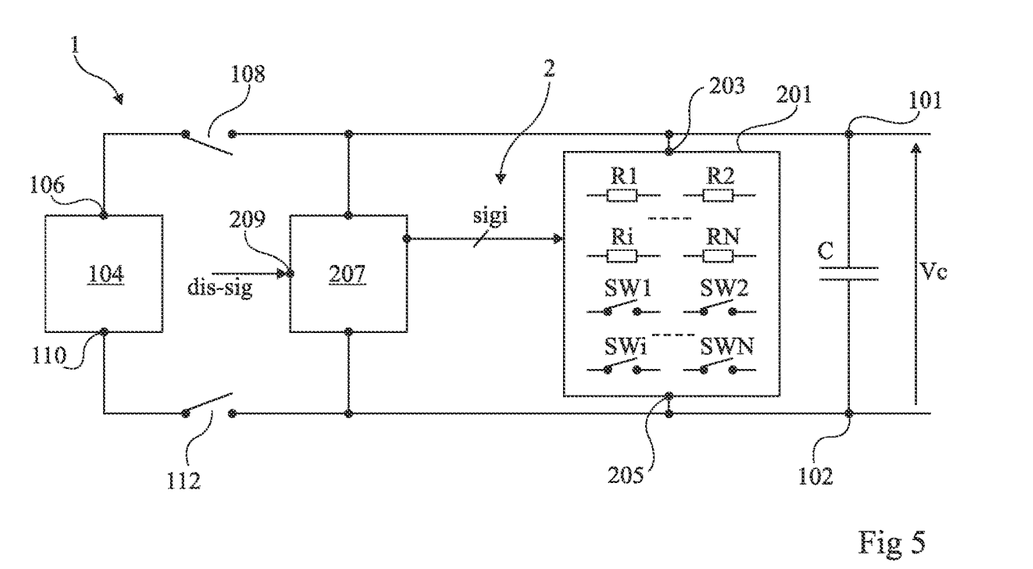
FIG. 5 schematically and partially shows in the form of blocks an example of a device comprising a circuit for discharging a capacitor according to still another embodiment.

FIG. 5 schematically shows in the form of blocks an example of the device 1 comprising a capacitor discharge device 2 according to still another embodiment. Only the differences between the devices 2 of FIGS. 2 and 4 and the device 2 of FIG. 5 are detailed herein.

The device 2 of FIG. 5 comprises N resistors or resistive elements Ri (R1, R2, ..., Ri, ..., RN) and N switches SWi (SW1, SW2, ..., SWi, ..., SWN), i being an integer in the range from 1 to N, and N being an integer greater than or equal to two. The embodiment of the device 2 of FIG. 5 differs from those of FIGS. 2 and 4 essentially in the way in which resistors Ri and switches SWi are connected together, between terminals 203 and 205.

In the embodiment of FIG. 5, the interconnection of the resistors Ri and of the switches SWi of resistive component 201 is such that, when all switches SWi are off, outside a discharge phase of capacitor C, resistive component 201 is equivalent to an open circuit. Further, the interconnection is such that, when capacitor C has to be discharged, switch SW1 is switched to the on state by circuit 207, resistive component 201 then having a first resistance value of resistor R1 associated with switch SW1. Further, the interconnection of resistors Ri and of switches SWi is such that, by the turning on, one after the other, of the switches SWi other than switch SW1, that is, by the turning on of switch SW2, and then of switch SW3, etc., until switch SWN, resistive component 201 takes decreasing values. Each of the decreasing values is associated with a switch SWi of index i having its turning on, in addition to the switches already on for the current resistance value of resistive component 201, causing the selection of a next resistance value of resistive component 201, associated with this switch. In other words, during a discharge of capacitor C, each selection of a value of resistive component 201 results from the turning on of one of the switches of resistive component 201, associated with this value. As an example, for N equal to four, resistive component 201 is equivalent to an open circuit when all switches SWi are off, and takes, during the discharge of capacitor C, four successive decreasing values, each associated with a different switch SWi.

As in FIG. 2, the circuit 207 of device 2 is configured to control resistive component 201, that is, to select the resistance value of resistive component 201. In other words, circuit 207 is configured to control the off or on state of each switch SWi of component 201. Thus, circuit 207 is configured to deliver a control signal to each switch of resistive component 201. In the example of FIG. 4, circuit 207 is configured to deliver N signals sigi, i being an integer in the range from 1 to N, the N signals being shown in the form of a bus in FIG. 5.

As in FIG. 2, circuit 207 preferably comprises a driver for each switch of resistive component 201, each driver being then configured to deliver the control signal of the switch of the resistive component 201 associated therewith.

As in FIG. 2, circuit 207 is configured to control resistive component 201 based on an indication that capacitor C should or not be discharged, and comprises input 209 configured to receive an indication that capacitor C should or not be discharged, input 209 being for example configured to receive signal dis-sig. Preferably, as long as circuit 207 receives no indication that capacitor C should be discharged, circuit 207 selects the maximum or default resistance value of resistive component 201 or, in other words, circuit 207 controls component 201 so that it is equivalent to an open circuit.

As in FIG. 2, during a discharge of capacitor C, circuit 207 is configured to select successive decreasing resistance values of resistive component 201. As an example, as soon as circuit 207 receives an indication that capacitor C should be discharged, circuit 207 selects a resistance value of resistive component 201 other than its maximum value for which it is equivalent to an open circuit, which marks the beginning of the discharge resistive of capacitor C. Then, during the discharge, circuit 207 successively selects decreasing resistance values of component 201. In the specific example of FIG. 5, when circuit 207 receives the indication that capacitor C should be discharged, the circuit controls the selection of a first resistance value of resistive component 201 by turning on the switch SW1 associated with this value, and then, during the discharge, circuit 207 controls the selection of successive decreasing resistance values of resistive component 201 by turning on one after the others switches SW2, SW3, SWi, SWN.

As in FIG. 2, during a discharge of capacitor C, circuit 207 is further configured to select the resistance values of resistive component 201 according to a discharge state or level of capacitor C. Circuit 207 is thus configured to determine a discharge state or level of capacitor C.

According to the embodiment illustrated in FIG. 5, circuit 207 is configured to determine or estimate the discharge level of capacitor C from the voltage Vc thereacross.

According to another embodiment, not shown, circuit 207 is configured to determine or estimate the discharge level of capacitor C from a duration which has elapsed since the beginning of the discharge of capacitor C.

According to an embodiment, the selection of a next resistance value of resistive component 201, during a discharge of capacitor C, is conditioned to the on state of the switch associated with the current resist resistive ance value of resistive component 201. As an example, in FIG. 5, while the current resistance value of component 201 is that which corresponds to the case where switches SW1 and SW2 are on, and capacitor C discharges, the selection of the next resistance value of resistive component 201 by the turning on of switch SW3 is conditioned on the on state of switch SW2. It will be within the abilities of those skilled in the art to implement the verification, by circuit 207, that a given switch of resistive component 201 is in the on state, for example, by providing for circuit 207 to be coupled, preferably connected, to each of the conduction terminals of this switch, which connections are not shown in FIG. 5.

It will be within the abilities of those skilled in the art, based on the functional indications given hereabove, to implement resistive component 201, and in particular to implement the interconnection, between terminals 203 and 205, of resistors Ri and of switches SWi.

It should be understood that the embodiments of device 2 described in relation with FIGS. 2 and 4 are specific cases of the embodiment described in relation with FIG. 5.

According to an embodiment of the devices 2 described in relation with FIGS. 2, 4, and 5, the switches of resistive component 201 are each implemented by a silicon controlled rectifier or SCR or thyristor. In this case, the signal for controlling such a switch is a current control applied to the control terminal or gate of the switch. An advantage of implementing the switches of resistive component 201 with thyristors is that they turn back off as soon as the current between terminals 203 and 205 becomes zero, that is, as soon as capacitor C has fully discharged through component 201.

Although this has not been indicated in the above description of embodiments of device 2, it should be understood that, during a phase of discharge of capacitor C, resistive component 201 only takes discrete values, and more particularly at least two discrete values, the resistive component further taking, outside a discharge phase of capacitor C, an additional value for which it is equivalent to an open circuit.

In the above description of embodiments of device 2 made in relation with FIGS. 2 to 5, each resistor Ri of resistive component 201 preferably designates a single resistor, although each resistor Ri may be implemented by means of any resistive element, for example, by means of a series and/or parallel association of a plurality of resistors.

Further, although the provision of a device 2 in device 1 has been described, the device 2 comprising circuit 207 and the resistive component 201 connected or intended to be connected in parallel with a capacitor may be provided in any device connected or intended to be connected to a capacitor which should desirably be discharged, particularly by respecting discharge constraints. For example, device 2 is compatible with a capacitor intended to be charged to a maximum voltage Vc greater than 10 V, for example, greater than 50 V, or even greater than 100 V.

Various embodiments and variations have been described. It will be understood by those skilled in the art that certain features of these various embodiments and variations may be combined, and other variations will occur to those skilled in the art.

Finally, the practical implementation of the described embodiments and variations is within the abilities of those skilled in the art based on the functional indications given hereabove. In particular, it will be within the abilities of those skilled in the art to determine the values of the resistances of resistive component 201 according to the targeted application, as well as the values of the voltage or time thresholds, each associated with one of the values taken by resistive component 201 during a phase of discharge of a capacitor in parallel with resistive component 201.

The invention claimed is:

1. A device for discharging a capacitor, comprising:
a resistive component having a resistance value selectable from among at least three resistance values, wherein said resistive component is configured to be connected in parallel with the capacitor; and
a circuit configured to select the resistance value of the resistive component through selective actuation of switches;
wherein, during a discharge of the capacitor, the circuit is configured to change from a current resistance value associated with circuit selection of a current switch of said switches in an on state to a next resistance value associated with circuit selection of a next switch of said switches in an on state in response to both: a sensed voltage across the capacitor falling to reach a threshold level associated with said next resistance value and a verification by said circuit that the current switch is in the on state.

2. The device of claim 1, wherein the next resistance value is less than the current resistance value.

3. The device of claim 1, wherein the resistive component comprises resistive elements and thyristor switches coupled together between a first terminal of the resistive component and a second terminal of the resistive component, the circuit being configured to control each of said thyristor switches of the resistive component.

4. The device of claim 3, wherein the resistive elements and the thyristor switches are coupled together so that each of said at least three resistance values is determined by a corresponding combination of states of said thyristor switches.

5. The device of claim 3, wherein the resistive elements and the thyristor switches are configured so that the resistive component corresponds to an open circuit when all the thyristor switches are off.

6. The device of claim 3, wherein the resistive elements and the thyristor switches are configured so that, during said discharge of the capacitor, each selection of a resistance value of the resistive component results from a turning on of one of said thyristor switches associated with this resistance value.

7. The device of claim 3, wherein the resistive component comprises as many branches in parallel between the first and second terminals of the resistive component as resistive elements, each branch comprising one of the resistive elements in series with one of the thyristor switches.

8. The device of claim 3, wherein the resistive elements and a first one of said thyristor switches are in series between the first and second terminals of the resistive component, each of said thyristor switches except for the first thyristor switch being configured to bypass one of said resistive elements in the on state.

9. The device of claim 1, wherein the circuit is configured to receive information indicating that the capacitor should be discharged.

10. The device of claim 9, wherein, in the absence of receipt of information indicating that the capacitor should be discharged, the device is configured so that a maximum value of the resistive component is selected.

11. A device for discharging a capacitor, comprising:
a resistive component having a resistance value selectable from among at least three resistance values, wherein said resistive component is configured to be connected in parallel with the capacitor; and
a circuit configured to select the resistance value of the resistive component through selective actuation of switches, each resistance value having an associated time threshold;
wherein, during a discharge of the capacitor, the circuit is configured to turn on a switch for a selected resistance value when a comparison indicates that an elapsed time since beginning of capacitor discharge reaches the associated time threshold for that selected resistance value.

12. The device of claim 11, wherein the next resistance value is less than the current resistance value.

13. The device of claim 11, wherein the resistive component comprises resistive elements and thyristor switches coupled together between a first terminal of the resistive component and a second terminal of the resistive component, the circuit being configured to control each of said thyristor switches of the resistive component.

14. The device of claim 13, wherein the resistive elements and the thyristor switches are coupled together so that each of said at least three resistance values is determined by a corresponding combination of states of said thyristor switches.

15. The device of claim 13, wherein the resistive elements and the thyristor switches are configured so that the resistive component corresponds to an open circuit when all the thyristor switches are off.

16. The device of claim 13, wherein the resistive elements and the thyristor switches are configured so that, during said discharge of the capacitor, each selection of a resistance value of the resistive component results from a turning on of one of said thyristor switches associated with this resistance value.

17. The device of claim 13, wherein the resistive component comprises as many branches in parallel between the first and second terminals of the resistive component as resistive elements, each branch comprising one of the resistive elements in series with one of the thyristor switches.

18. The device of claim 13, wherein the resistive elements and a first one of said thyristor switches are in series between the first and second terminals of the resistive component, each of said thyristor switches except for the first thyristor switch being configured to bypass one of said resistive elements in the on state.

19. The device of claim 11, wherein the circuit is configured to receive information indicating that the capacitor should be discharged.

20. The device of claim 19, wherein, in the absence of receipt of information indicating that the capacitor should be discharged, the device is configured so that a maximum value of the resistive component is selected.

21. A device for discharging a capacitor, comprising:
a resistive component having a resistance value selectable from among at least three resistance values, wherein said resistive component is configured to be connected in parallel with the capacitor; and a circuit configured to select the resistance value of the resistive component by selectively turning on a switch circuit associated with each resistance value;

wherein, during a discharge of the capacitor, the circuit is configured to change from a current resistance value to a next resistance value in response to a verification that the switch circuit associated with the current resistance value is turned on before turning on the switch circuit associated with the next resistance value.

22. The device of claim 21, wherein the next resistance value is less than the current resistance value.

23. The device of claim 21, wherein the resistive component comprises resistive elements and switch circuits coupled together between a first terminal of the resistive component and a second terminal of the resistive component, the circuit being configured to control each of said switch circuits of the resistive component.

24. The device of claim 23, wherein the resistive elements and the switch circuits are coupled together so that each of said at least three resistance values is determined by a corresponding combination of turned on states of said switch circuits.

25. The device of claim 23, wherein the resistive elements and the switch circuits are configured so that the resistive component corresponds to an open circuit when all the switch circuits are turned off.

26. The device of claim 23, wherein the resistive elements and the switch circuits are configured so that, during said discharge of the capacitor, each selection of a resistance value of the resistive component results from a turning on of one of said switch circuits associated with this resistance value.

27. The device of claim 23, wherein the resistive component comprises as many branches in parallel between the first and second terminals of the resistive component as resistive elements, each branch comprising one of the resistive elements in series with one of the switch circuits.

28. The device of claim 23, wherein the resistive elements and a first one of said switch circuits are in series between the first and second terminals of the resistive component, each of said switch circuits except for the first switch circuit being configured to bypass one of said resistive elements in the turned on state.

29. The device of claim 21, wherein the circuit is configured to receive information indicating that the capacitor should be discharged.

30. The device of claim 29, wherein, in the absence of receipt of information indicating that the capacitor should be discharged, the device is configured so that a maximum value of the resistive component is selected.

* * * * *